July 14, 1953  A. SOLARI  2,645,759
SWIVEL JOINT FOR MULTICONDUCTOR ELECTRIC CABLES
Filed July 22, 1950

INVENTOR
ALFREDO SOLARI

BY *Richards Geier*
ATTORNEYS

Patented July 14, 1953

2,645,759

UNITED STATES PATENT OFFICE 2,645,759

SWIVEL JOINT FOR MULTICONDUCTOR ELECTRIC CABLES

Alfredo Solari, Buenos Aires, Argentina

Application July 22, 1950, Serial No. 175,343
In Argentina February 7, 1950

3 Claims. (Cl. 339—8)

This invention refers to a swivel-joint for multiconductor electric cables, and more particularly to a swivel-joint adapted to be used with the cable connecting the microtelephone to the telephone apparatus as used in modern telephone installations.

There exists a plurality of swivel-joints which are used in combination with the microtelephone cable in order to prevent the twisting of the cable connecting the microtelephone to the other part of the telephone installation. However, most of these devices either comprise such a plurality of individual contact and/or holding elements that their manufacture cannot be carried out on a satisfactory economic basis or do not operate satisfactorily from an electric point of view as a result of constructive oversimplification.

The electrical and constructive problems to be solved in a swivel-joint to be used in a telephone installation are numerous and even conflicting. Electrically, a swivel joint of the type described should allow of the passage of a relatively weak electric current independently of the relative position of the two joint members inserted in the telephone cable, and what is more important, without noise being generated in the corresponding electrical circuit by the friction between the contact elements to which the respective conductors of the cable are connected. For this purpose, both members of the swivel-joint are usually urged one against the other by means of some elastic means and here the problem arises of adjusting the elastic pressure between both joint members in such a manner that a satisfactory electrical connection is obtained between the individual contact members without simultaneously increasing the friction to a value which would make it nearly impossible to the joint members to follow the rotary movements of the cables to which they are attached.

On the other hand, it is obvious that public acceptance of a swivel joint to be used in microtelephone cords will depend to a high degree on the selling price and ease of installation and both are effected by the number and configuration of parts constituting the complete swivel joint assembly, so that a swivel joint should contain as few parts as possible and these should be designed so as to be adapted to mass-production methods.

A further constructive problem which must be solved satisfactorily in a swivel-joint of the type referred to, is the connection of the individual conductors of the cable to the respective contact elements of the joint-members. It will easily be understood that it is desirable to make this connection by means of soldered joints which offers the best union from an electrical point of view. However, it is also necessary to make this union between the conductors and the contact elements in such a manner that a twisting of the joint members with respect to the cables to which they are connected is avoided as far as possible and it would appear that not all of the known swivel-joints offer satisfactory solutions in this respect.

The above-mentioned problems have found satisfactory solutions in th swivel-joint according to the present invention which being constituted by a male and female contact-carrying member of insulating material are provided with an equal number of opposite concentrically arranged contact seats each carrying an annular contact element of conducting material, these members being swivelly joined to define a plurality of stepped and enclosed contact chambers each containing elastic intermediate contact means arranged between the annular contact elements, the rear faces of each of said joint members being provided with a cylindrical extension carrying a plurality of longitudinal recesses each capable of receiving an individual conductor of the cable to be joined and terminating in a bore communicating each of said recesses with one of said concentric contact seats.

One of the main objects of the present invention consists in providing a swivel joint reduced longitudinal extension due to the stepped arrangement of the contacts and contact chambers.

A further object of the present invention consists in providing a swivel joint in which the contacts are protected by means of enclosed contact chambers.

A still further object of the present invention is to provide a swivel joint in which each contact-carrying member is holding each individual conductor of the cable firmly in place along a portion of its length.

Other objects and features of the invention will become apparent as the specification proceeds.

The invention will now be more specifically described with reference to the accompanying drawings which are to be understood explicative of the invention and not limitative of its scope.

In the drawings.

In the figures, similar or corresponding elements are designated with the same reference numerals.

Figure 1:
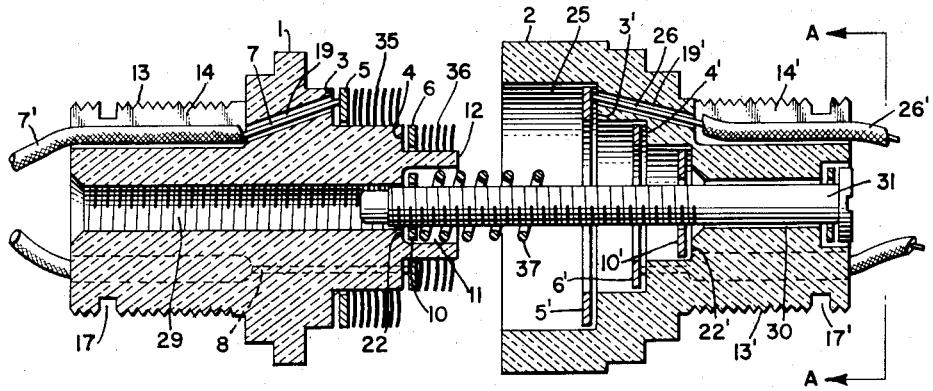
Fig. 1 is a longitudinal cross section of the swivel joint according to the invention showing the component parts thereof in a partially uncoupled position on a considerably amplified scale.

As can be observed in the drawings, the swivel joint according to the invention comprises a male contact-carrying member 1 of insulating material and a female contact-carrying member 2 of the same material, both of substantially cylindrical configuration, and swivelly joined as will be explained hereinafter. Contact carrying member 1 is provided with a stepped extension presenting the seats 3 and 4 on which are arranged contact rings 5 and 6, respectively, to which are joined electrically the conductors 7 and 8 of a microtelephone cable $a$ the third conductor of which (strand 9', Fig. 2) is electrically connected to a third contact ring 10, seated on the bottom 22 of a coaxial cavity 11 formed in a coaxial stud 12.

Figure 2:
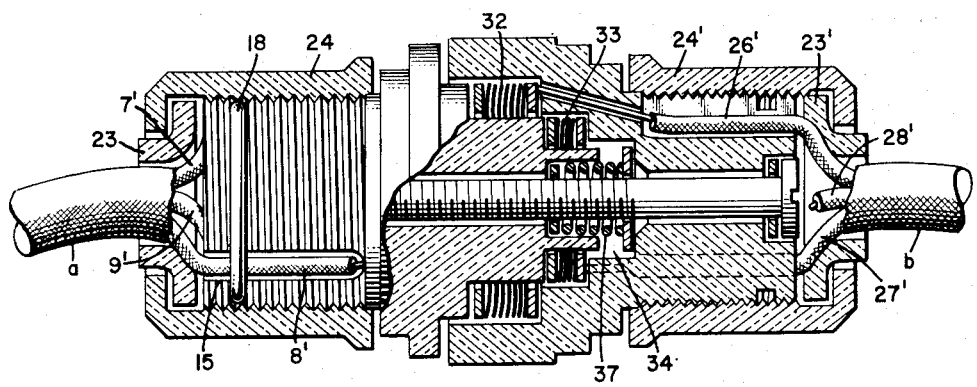
Fig. 2 is a longitudinal cross section of the swivel joint showing the component parts thereof in a coupled position.
Figure 3:
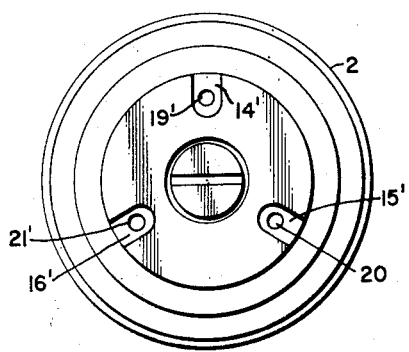
Fig. 3 is an end view in the direction of arrows A—A in Fig. 1; and finally

As can be observed in Figs. 1, 2 and 3, the rear end of the male contact-carrying member 1 is provided in a threaded stud 13 in which there exist three longitudinal recesses (of which only one, 14, is shown in Fig. 1) distributed equidistantly along the periphery of stud 13 and each adapted to receive one of the strands 7', 8' or 9' of cable $a$, as can be clearly observed in Figs. 1 and 2, where it is shown how strands 7' and 8' of cable $a$ are arranged in longitudinal recesses 14 and 15, respectively. Since strands 7', 8' and 9' of cable $a$ are arranged in the respective longitudinal recesses of stud 13, there exists a substantially perfect union between these two elements as far as rotational movements are concerned. In order to prevent a displacement of strands 7', 8' and 9' in their respective recesses, stud 13 is provided with an annular groove 17 designed to receive, as can be observed in Fig. 2, several turns of a cord 18, so that the strands of cable $a$ are firmly held in place on extension 13.

The bare conductors 7 and 8 of strands 7' and 8' of the cable, as well as the bare conductor corresponding to strand 9' (this conductor has not been illustrated in the drawings) are located in bores communicating the respective longitudinal recesses with the respective contact seats 3, 4 and 22 of the male contact-carrying member 1, as can be observed in Fig. 1 with respect to conductor 7 which is located in a bore 19. In order to complete the electrical connection the conductors of strands 7', 8' and 9' are soldered to the respective contact rings 3, 4 and 10 and in order to prevent any longitudinal stresses acting on these soldered joints, a retention collar 23 and threaded bushing 24 are slipped on cable $a$, the retention collar 23 holding firmly in place the cable once bushing 24 is threaded on stud 13 of the male contact-carrying member 1.

Female contact-carrying member 2 of insulating material comprises a recess 25 on the walls of which there are provided three stepped coaxial seats 3', 4' and 22' on which there are arranged contact rings 5', 6' and 10' respectively, these contact rings being similar to the contact rings used in the male contact carrying member 1.

Female contact-carrying member 2 is also provided with a threaded stud 13' on which there exist three longitudinal recesses 14', 15' and 16' (see Fig. 3) arranged in exactly the same manner as shown with reference to male contact-carrying member 1 and of which one 14' can be observed in Fig. 1. Each of these recesses is designed to receive one of the strands 26', 27' and 28' of a cable $b$ (Fig. 2) the bare conductors of which are inserted in the respective bores (19', 20', 21', Fig. 3) communicating each of the longitudinal recesses with one of the contact seats 3', 4' and 22' these conductors being soldered or electrically connected to the respective contact rings 5', 6' and 10' of female contact-carrying member 2. Fig. 1 illustrates the manner in which strand 26' is arranged in recess 14' and how bare conductor 26 of this strand passes through bore 19' to contact ring 5'—the other conductors being connected to the other contact rings in a similar manner.

Stud 13' is also provided with an annular groove 17' adapted to receive several turns of a string used to hold firmly in place strands 26', 27' and 28' of cable $b$ and there also exists a retention collar 23' and a threaded bushing 24' designed to be screwed on stud 13' and to hold cable $b$ firmly in place by means of retention collar 23'.

Figure 4:
Fig. 4 is a perspective view of an elastic washer used as one of the intermediate contact means in the swivel joint according to the invention.

In order to allow the relative rotational movement of members 1 and 2, both are provided with axial bores 29 and 30, respectively, the former being provided with a thread designed to receive the threaded end of a bolt 31 the other portion of which is freely located in axial bore 30 of female contact-carrying member 2, so that in the coupled position of members 1 and 2, these members can rotate one with respect to the other, but any longitudinal movement is prevented by bolt 31. As can be observed in Fig. 2, in the coupled position, there are formed in recess 25 of female contact-carrying member 2 three stepped and enclosed contact chambers 32, 33 and 34 which laterally are limited by the respective contact rings and each of which contains elastic intermediate contact means which provide the electrical contact between these contact rings. As can be seen in the drawings, in contact chambers 32 and 33, these elastic intermediate contact means is constituted by a plurality of elastic washers 35 and 36, one of which is shown on a considerable amplified scale in Fig. 4, while the elastic intermediate contact means used in chamber 34 are constituted by a helical spring 37 arranged on bolt 31.

Washers 35 and 36 are made of an elastic conducting material and are slightly twisted to present the necessary elasticity on being arranged between the corresponding contact rings.

The elastic intermediate contact means provide a satisfactory electrical contact between the corresponding strands of cables $a$ and $b$ without hindering a relative rotational movement of elements 1 and 2 of the swivel joint so that, if this swivel joint is used for instance in the microtelephone cable, the usual twistings of the latter are avoided.

From the foregoing description it will be understood that, basically and as far as their main constructive features are concerned, the contact-carrying members 1 and 2 can easily be manufactured on the same machines and in the same jigs which considerably reduces the costs of manufacture of the swivel joint according to the invention. It will also be easily understood that the other constructive elements of the swivel joint, for instance the contact rings and elastic washers, are so designed that it is only necessary to manufacture one or two types only, and this represents a further economy in the manufacturing costs.

On the other hand, it will be evident that modifications of the shown elements are possible within the scope of the appended claims.

What I claim is:

1. A swivel joint for multiconductor electric cables comprising a cylindrical male contact-carrying member of insulating material provided with a first and a second stepped and concentrically arranged contact seats and a third inner contact seat corresponding to the bottom of a hollow coaxial stud, a cylindrical female contact-carrying member of insulating material including a cylindrical recess the wall of which is provided with three stepped and concentrically arranged contact seats cooperating in pairs with the contact seats of said male contact-carrying member, a contact ring of conducting material arranged on each of said contact seats, each of said contact-carrying members being provided with a cylindrical threaded rear extension provided with three longitudinal recesses of equal depth distributed symmetrically along the periphery of said extension and each adapted to receive one strand of said multiconductor cable, a bore communicating the inner end of each of said longitudinal recesses with one of said contact seats and adapted to receive the conductor of the strand arranged in the respective longitudinal recess, a bolt swivelably coupling said male and said female contact-carrying members with the contact seats of said male contact-carrying member being arranged in said cylindrical recess of said female contact-carrying member to constitute three enclosed contact chambers, elastic washers of conducting material arranged in the outer two contact chambers to constitute the elastic intermediate contact means between the respective contact rings, and a helical spring arranged on said bolt and in the third inner contact chamber to constitute the elastic intermediate contact means between the contact rings in said contact chamber, a circular groove provided on each of said threaded rear extensions, a cord arranged in said circular groove to fasten the strands of the cable located in said longitudinal recesses, a retention collar on each cable connected to each of said contact-carrying members, and a threaded bushing on each of said threaded rear extensions to press said retention collar against the contact-carrying member and to join said cable to the respective contact-carrying member.

2. A swivel-joint for multi-conductor electric cables, the joint comprising a male and a female member of electrically insulated material, the male member having at one end integrally formed concentric extensions, the diameters of the extensions progressively decreasing toward the end extension and the number of extensions being equal to the number of conductors and the end extension having a cylindrical cavity formed therein, an electrically conductive ring for the cavity of the end extension and for the rim of each successive extension; the female member having formed therein stepped recesses coacting with the extensions of the male member, an electrically conductive ring for each recess of the female member, an electrically conductive bolt axially disposed through the male and female members, said members being rotatable on the bolt with the rings of the corresponding projections and recesses in spaced arrangement, the bolt being electrically connected to the ring of the end projection and the ring in the corresponding recess of the female member and electrically insulated from the other rings, an electrically conductive helical spring disposed around the bolt and coacting with the ring in the recess of the male member and the ring in the corresponding recess of the female member, and elastic electrically conductive washers disposed intermediate the remaining corresponding rings of the members, the washers being insulated from the bolt.

3. A swivel-joint for multi-conductor electric cables according to claim 2 in which the elastic electrically conductive washers are twisted, the twist maintaining the corresponding rings in spaced arrangement with a substantially uniform tension.

ALFREDO SOLARI.

References Cited in the file of this patent

UNITED STATES PATENTS

| Number | Name | Date |
|---|---|---|
| 1,174,379 | Bacon | Mar. 7, 1916 |
| 1,535,780 | Jones | Apr. 28, 1925 |
| 1,712,666 | Guest | May 14, 1929 |
| 1,837,890 | Baker | Dec. 22, 1931 |
| 2,465,022 | Laubi | Mar. 22, 1949 |